(12) United States Patent
Holland

(10) Patent No.: US 7,295,249 B2
(45) Date of Patent: Nov. 13, 2007

(54) DIGITAL TELEVISION DISPLAY CONTROL APPARATUS AND METHOD

(75) Inventor: Brian George Holland, Cornwall (GB)

(73) Assignee: Intel Corporation, Santa Clara, CA (US)

(*) Notice: Subject to any disclaimer, the term of this patent is extended or adjusted under 35 U.S.C. 154(b) by 548 days.

(21) Appl. No.: 10/825,588

(22) Filed: Apr. 16, 2004

(65) Prior Publication Data
US 2004/0263690 A1 Dec. 30, 2004

(30) Foreign Application Priority Data
Apr. 30, 2003 (GB) .................................. 0309810.0

(51) Int. Cl.
| | |
|---|---|
| H04N 5/50 | (2006.01) |
| H04N 5/445 | (2006.01) |
| H04N 9/74 | (2006.01) |
| H04N 9/76 | (2006.01) |
| G09G 5/02 | (2006.01) |
| G09G 5/10 | (2006.01) |
| G09G 5/36 | (2006.01) |
| G09G 5/399 | (2006.01) |
| G06F 15/167 | (2006.01) |

(52) U.S. Cl. .................. 348/600; 348/563; 348/569; 348/589; 345/539; 345/542; 345/560; 345/600

(58) Field of Classification Search .............. 348/563, 348/569, 570, 589, 600; 345/600–605, 629, 345/539, 542, 560
See application file for complete search history.

(56) References Cited

U.S. PATENT DOCUMENTS 5,764,228 A * 6/1998 Baldwin .................. 715/797
5,969,727 A 10/1999 Kaneko .................. 345/508
6,288,750 B1 * 9/2001 Yamada et al. .......... 348/553
6,369,855 B1 * 4/2002 Chauvel et al. .......... 348/423.1
6,462,744 B1 * 10/2002 Mochida et al. .......... 345/543
7,015,974 B2 * 3/2006 Lee .......................... 348/569
7,129,993 B2 * 10/2006 Park ......................... 348/569
7,164,431 B1 * 1/2007 Chu et al. ................. 345/636
2004/0164988 A1 * 8/2004 Matsumoto ............... 345/536
2005/0030428 A1 * 2/2005 Kotani et al. ............. 348/569

FOREIGN PATENT DOCUMENTS

| JP | 9-205597 | 8/1997 | .................... 5/445 |
|---|---|---|---|
| KR | 1997-0007480 | 1/1996 | .................... 5/445 |

* cited by examiner

Primary Examiner—Brian P. Yenke
(74) Attorney, Agent, or Firm—Blakely, Sokoloff, Taylor & Zafman LLP

(57) ABSTRACT

Apparatus for controlling a digital television display, the apparatus comprising a main processor 4, a main memory 5 coupled to said main processor 4 via address and data busses, the main memory 5 being arranged to store at least temporarily video data for display, and on-screen display graphics for overlaying on video data. Mixing means 15 is provided for mixing video data read from the main memory 5 under the control of the main processor 4, with on-screen display graphic data. At least one line buffer 13a,13b is provided for storing a line of on-screen display graphic data. Hardware processing means 9 is arranged to compose a line of on-screen display graphic data in the line buffer 13a,13b by reading appropriate on-screen display graphic data from said main memory 5 and writing it to the line buffer, and for providing the composed line of data to said mixing means 15.

11 Claims, 2 Drawing Sheets

DIGITAL TELEVISION DISPLAY CONTROL APPARATUS AND METHOD

FIELD OF THE INVENTION

The present invention relates to a method and apparatus for controlling a digital television display. More particularly, though not necessarily, the invention relates to the display of on-screen display graphics on a digital television display.

BACKGROUND TO THE INVENTION

The display of a digital television signal is usually facilitated by means of a set-top box connected between the television signal receiver (e.g. aerial or satellite dish) and the television itself. Of course, the functionality of the set-top box may be incorporated into the television. Consumers have an expectation regarding the costs of set-top boxes. Typically, they expect them to be relatively cheap, for example in the region of £100. This expectation places severe restraints on set-top box design, particularly in terms of the processing power and memory which they can provide. In order to achieve such low cost products, manufacturers have sought to provide essentially single-chip solutions in which all of the processing required to decode and display the television signal is provided on a single chip. The only significant component not provided on this chip will be a main memory, typically an SDRAM.

Any competitive set-top box product must have a facility for displaying on-screen display (OSD) graphics. These appear on-screen as graphic elements overlaid on the video signal, and may for example be used to provide channel identifiers (e.g. BBC1, BBC2, etc) and volume level indicators. OSD graphics are stored as bitmap images in the main SDRAM. A bitmap comprises a colour code for each pixel to be displayed on the screen, at a position within a two dimensional storage array which reflects the actual screen resolution. The colour code can be in various formats, each requiring a different number of bits ranging, typically, from 4 to 32 bits. The formats encompass true, or direct, colour representations in which a number of bits are allocated to each colour component (RGB or luma/chroma), through to a colour code which represents a limited choice out of a range of colours defined by the originator. When the bitmap is to be displayed, this code is translated to a real colour through a lookup table stored in the SDRAM.

The SDRAM also provides two areas referred to here as OSD frame stores. Each OSD frame store is an area of memory mapped to the television display, i.e. each memory element of the frame store is mapped to a corresponding pixel of the display. The OSD graphics to be overlaid on a video frame are loaded into a frame store prior to display. The frame store date is then read out, line by line, and passed to a mixer where it is mixed with the video data. Mixing may be done using a process known as "alpha blending" which allows image data to be layered, with underlying layers being visible to a greater or lesser extent. Whilst data is being read from one OSD frame store, the other OSD frame store is being loaded with the data for the next frame. Typically, the SDRAM also provides a pair of video frame stores which are loaded with video data. Data is read from each of the video frame stores in turn, for mixing with the OSD data.

A typical OSD or graphics screen consists of a number of separate, but smaller, bitmaps ("objects") which are put together (or composed) at display time. With the frame store approach these objects must be copied from their normal storage area into the correct position in the complete frame store. If an object is repeated, it has to be copied more than once, i.e. it has to be copied to several positions in the frame store. Every time an object moves (e.g. during an animation sequence) the complete frame store must be re-composed. The need to fill the background space between individual objects also complicates the frame store composition process.

The copying of pixels belonging to an object is done using software running on the main processor of the set-top box. This is a time consuming process, wasting much of the power of the main processor and the available access bandwidth in the common storage area (i.e. the maximum rate at which data can be written to and read from the SDRAM). The software copying of a pixel is known as a BitBlt operation, and is sometimes assisted by a special hardware BitBlt Processor. However, this does not reduce the storage bandwidth requirements.

With the frame store approach, the whole contents of the OSD frame store is read out at the screen display rate. This represents an extremely inefficient use of processing power and of the memory bandwidth, given that the OSD or graphic to be displayed often occupies only a small area of the screen (or several small areas of the screen), with video occupying the rest of the screen.

In order to reduce the processing and memory bandwidth requirements, hardware in present generation Digital TV Systems uses the concept of planes (usually four) and regions in order to construct a user screen. Planes allow backgrounds, still video, and OSD to be overlaid with a fixed priority order, and then merged with the decoded video. Regions are bitmap areas in the OSD plane, which are usually smaller than the display screen but which have the same pixel resolution and use a common colour lookup table. Unfortunately, hardware restrictions prevent regions from occupying the same TV line, never mind actually overlapping with a specified display priority.

The provision of hardware to implement planes and regions does to some extent reduce the software burden in constructing a screen. This is because only a region which is smaller than the full screen may have to be composed from the various bitmap images (or objects) which make up the OSD plane. The process, however, still involves physically moving bitmaps around in the SDRAM in order to construct a single bitmap for the complete region. Every time an object is moved, the whole process still has to be repeated.

Provider specifications now require that video stills be repeated over the screen (tiling effects), and that vertical wipes between stills be possible. They also ask for animation in the OSD plane, and require that Digital Video Broadcasting (DVB) subtitling requirements be supported. The DVB specification for subtitles defines the concept of objects and regions, where a region can contain many objects with no restrictions on line occupancy. A region is simply a vertically separated area on the screen with a common colour palette and background fill colour. The descriptors for objects allow them to be characters or bitmaps, and give each object an identification number (ID). The region descriptor defines which objects are to be present through their ID numbers, and also defines the position of each object on the screen. Thus objects can be repeated in the region without the need to transmit the bitmap of that object more than once.

Unfortunately present generation systems would have to construct each region as a complete bitmap in their microprocessor memory space. Thus each received object bitmap would have to be moved from its own storage area into the correct physical position in the memory representation of a complete region. In addition, the vacant space between objects within a region would have to be filled with a defined colour. When an object is moved or deleted the whole region would have to be re-constructed.

SUMMARY OF THE INVENTION

It is an object of the present invention to reduce the need for extensive BitBIT operations, and also to eliminate the need to read the contents of a complete OSD frame store when the OSD or graphic area(s) is(are) smaller than full screen.

According to a first aspect of the present invention there is provided apparatus for controlling a digital television display, the apparatus comprising:

a main processor;
a main memory coupled to said main processor via address and data busses, the main memory being arranged to store at least temporarily video data for display, and on-screen display graphics for overlaying on video data;
mixing means for mixing video data read from the main memory under the control of the main processor, with on-screen display graphic data;
at least one line buffer for storing a line of on-screen display graphic data; and
hardware processing means for composing a line of on-screen display graphic data in the line buffer by reading appropriate on-screen display graphic data from said main memory and writing it to the line buffer, and for providing the composed line of data to said mixing means.

Typically, the line buffer is a random access memory, having input/output data and address lines.

As the line buffer is not a part of the main memory, only a single main memory read operation is required per on-screen display graphic/per line. It is not necessary to transfer graphic data between locations in the main memory. Read-out from the line buffer does not occupy the main memory access bandwidth or the main processor. Therefore, whilst the line buffer is being written to and read from, the main processor can be performing other tasks, and the main memory accessed for other purposes.

Preferably, the apparatus comprises at least two line buffers, one of the buffers being written to by said hardware processing means whilst the other is being read from.

Preferably, the apparatus comprises a first memory for storing a list of on-screen display objects and a second memory for storing object descriptors, each entry in said list pointing to an object descriptor, and each descriptor specifying a bitmap stored in said main memory. The main processor is arranged to load into the first and second memories, for each frame to be displayed, object and descriptor data for that frame. Based upon the contents of the first and second memories, said hardware processing means reads appropriate on-screen display graphic data from said main memory and writes it to the line buffer.

Preferably, said main processor, said line buffer(s), and said hardware processing means are integrated onto a single chip, with the main memory being provided on a separate device.

According to a second aspect of the present invention there is provided a method of controlling a digital television display, the method comprising:

in a main memory controlled by a main processor, storing at least temporarily video data for display, and on-screen display graphics for overlaying on video data;
composing a line of on-screen display graphic data in a line buffer by reading appropriate on-screen display graphic data from said main memory and writing it to the line buffer; and
reading data from the line buffer and mixing the read data with video data read from the main memory.

Preferably, said on-screen display graphics comprise one or more objects, each represented by a corresponding bitmap.

Preferably, the method comprises loading an object list into a first random access memory, the list defining objects to be displayed in a display frame, and loading a descriptor list into a second random access memory, the descriptor list defining bitmap characteristics and main memory storage locations. Entries in the object list point to entries in the descriptor list. For a given frame, the contents of the first and second memories are inspected to determine which on-screen display graphics data should be loaded into the line buffer, on a line-by-line basis. Preferably, this comprises comparing the vertical extent of each graphic or object with the vertical location of the line currently under construction in the line buffer. If the graphic contributes to the current line, the corresponding line data for the graphic is read from the main memory to the line buffer.

Preferably, where graphic data is stored in the main memory in RGB colour space, the data is converted to YcrCb colour space prior to writing it to the line buffer.

Preferably, where graphic data is stored in the main memory in 4:4:4 colour resolution, data read from the line buffer is converted into 4:2:2 colour resolution prior to mixing with video data.

DETAILED DESCRIPTION OF CERTAIN EMBODIMENTS

Figure 1:
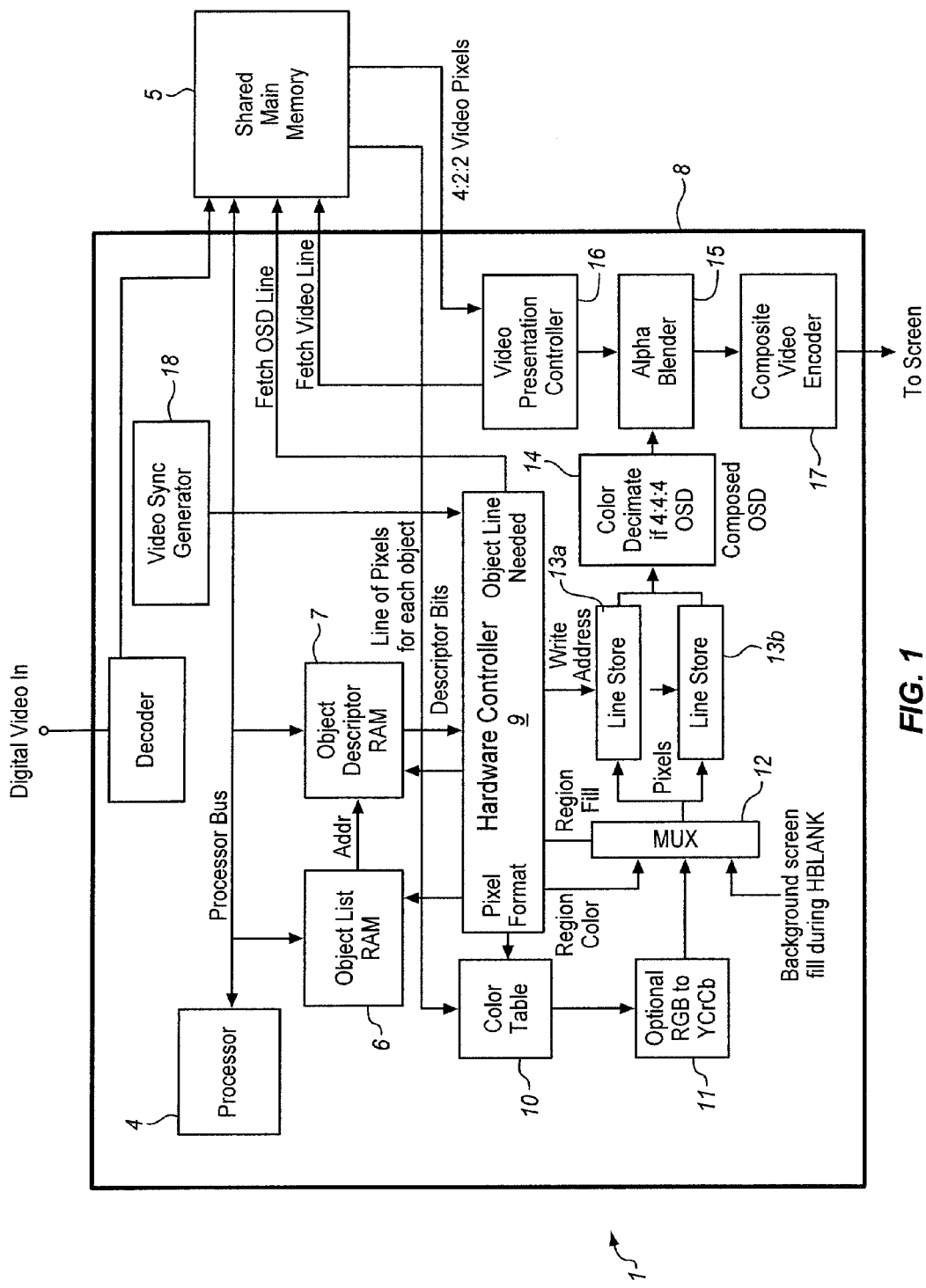
FIG. 1 illustrates schematically the architecture of a set-top box for use in providing digital video signals to a television display.

There is illustrated in FIG. 1 an exemplary architecture for a set top box. The set top 1 box receives at a video input 2 a digital television signal. This signal is passed to a decoder 3. Under the control of a main processor 4, the output signals from the decoder 3 are written to one of two areas of a main memory (SDRAM) 5 referred to here as the video "frame stores". These frame stores are mapped to the television display screen. Whilst data is being read out from one of the frame stores, data is being written to the other. On-screen display (OSD) graphics or "objects" are also stored in the SDRAM 5 as bitmap images. These may be stored either with a 4:4:4 colour resolution or a 4:2:2 colour resolution, and either in RGB or YcrCb colour space.

The main processor 4 implements a decision to display OSD graphics. This process makes use of two dedicated memories, an object list RAM 6 and an object descriptor RAM 7, coupled to the processor bus. Typically, whilst the SDRAM 5 is provided by on off-chip memory device, the object list and object descriptor RAMs are integrated onto the same chip as the main processor 4 and other components shown within the box 8 in FIG. 1. Read-out from the object list RAM 6 is controlled by a hardware controller 9, and is provided to an input of an object descriptor RAM 7 which is also controlled by the hardware controller 9. Outputs from the object descriptor RAM 7 are provided to an input of the hardware controller 9, which, in dependence upon the data provided at this input, controls read-out from the SDRAM 5.

Data read-out from the SDRAM 5 under the control of the hardware controller 9 is provided to an input of a colour table block 10. This block converts the colour data according to a colour coding specified by the hardware controller 9. The hardware controller 9 also provides control inputs to turn on and off an RGB to YcrCb conversion block 11 (as required). The output from the colour table block 10 (or optionally the RGB to YcrCb conversion block 10) is provided to an input of a multiplexer 12 which also receives at respective further inputs region colour and region fill data. The output from the multiplexer is applied to an input of one of a pair of line stores 13a,13b implemented in standard on-chip static RAM. The line stores receive a control signal from the hardware controller 9 which identifies, for a given line, the starting (x) position of an object on that line.

Outputs from the line stores 13a,13b are provided to an input of a colour decimate block 14 which decimates 4:4:4 colour resolution bitmap images down to the 4:2:2 resolution required for video, if the bitmaps are not already stored in this format in the SDRAM 5. The output from the colour decimate block 14 is provided to one of two inputs of an alpha blender 15. The other input to the alpha blender is provided by an output of a video presentation controller 16 which reads (4:2:2, YcrCb) data out from one of the two video frame stores at the appropriate rate. The output of the alpha blender 15 is provided to an input of a composite video encoder 17 which generates the signal for driving the display (converting colour components into composite video).

A video sync generator 18 provides a line count signal to the hardware controller 9, incremented at the line update rate of the display. The hardware controller 9 receives at a second input an output from the object descriptor RAM 7 specifying the start and end lines for a given object to be displayed. The hardware controller 9 makes a decision on whether an object contributes data to the current line as indicated by the line count signal, and provides a read signal to the SDRAM 5 if the answer is yes.

The Object List and Descriptor RAMs 6,7 are loaded by software (running on the main processor), during the vertical blanking interval before a new frame is to be displayed, with object data for the next but one frame. The Descriptor RAM 7 is loaded with information specifying each object which is to be displayed, namely:

SDRAM memory start address of the object bitmap.

A memory offset which allows only a window within an object to be displayed.

The horizontal (X) position on the screen. The X position defines the first line buffer write address, and objects can be moved by simply changing these coordinates.

The width of the rectangle encompassing the part of the object which is to be displayed in pixels.

The start and end lines of the object to be displayed, with reference to active graphics lines (1-480 for NTSC, or 1-576 for PAL).

The pixel resolution in a specified format.

The global video alpha blending value when pixel blending is not to be used.

A bit to enable the above operation on an object by object basis.

A bit to indicate overwriting of an existing pixel rather than blending with existing pixel.

A bit to use Colour 0 as a transparency indicator.

An identification field for the colour lookup table.

A bit which indicates that the object is a DVB region fill (pseudo) object, with a single pixel value.

A typical bit allocation is given below, arranged around three, 32 bit words.

| | | |
|---|---|---|
| Word 1 | Screen X position | 10 bits |
| | Start Line | 10 bits |
| | End Line | 10 bits |
| | Region Fill enable | 1 bit |
| | Transparency on/off | 1 bit |
| Word 2 | Memory address | 23 bits |
| | CLUT address | 6 bits |
| | Global alpha value | 2 bits |
| Word 3 | Pixel Format | 4 bits |
| | Object width | 10 bits |
| | Address Offset (for object window) | 16 bits |
| | Object alpha blending on/off | 1 bit |

The List RAM 6 is loaded during the vertical blanking interval with a list of the objects which are to be displayed in the current frame, with the order defining the display priority if alpha blending is disabled (priority increasing with increasing position in the list). In effect, each object is defined by a pointer to the position of its descriptor words in the Descriptor RAM. Additional bits allow N objects to be skipped if they are not needed in a particular frame. Objects can thus be added, deleted, have their priority changed, or just skipped without changing the descriptor RAM until absolutely necessary, further reducing the load on the processor and use of the SDRAM bandwidth.

As already mentioned, two 720×N bit line stores 13a,13b are provided, where N depends on the application. In a typical digital TV system the colour would be in the Y Cr Cb space, where 6 bits for Y plus 5 bits for each of the colour components would be adequate. A 2 bit video alpha value is sufficient, and N is thus 18 bits. (An extra bit would allow OSD bitmaps to be in 4:4:4 or 4:2:2 spatial resolution.)

Figure 2:
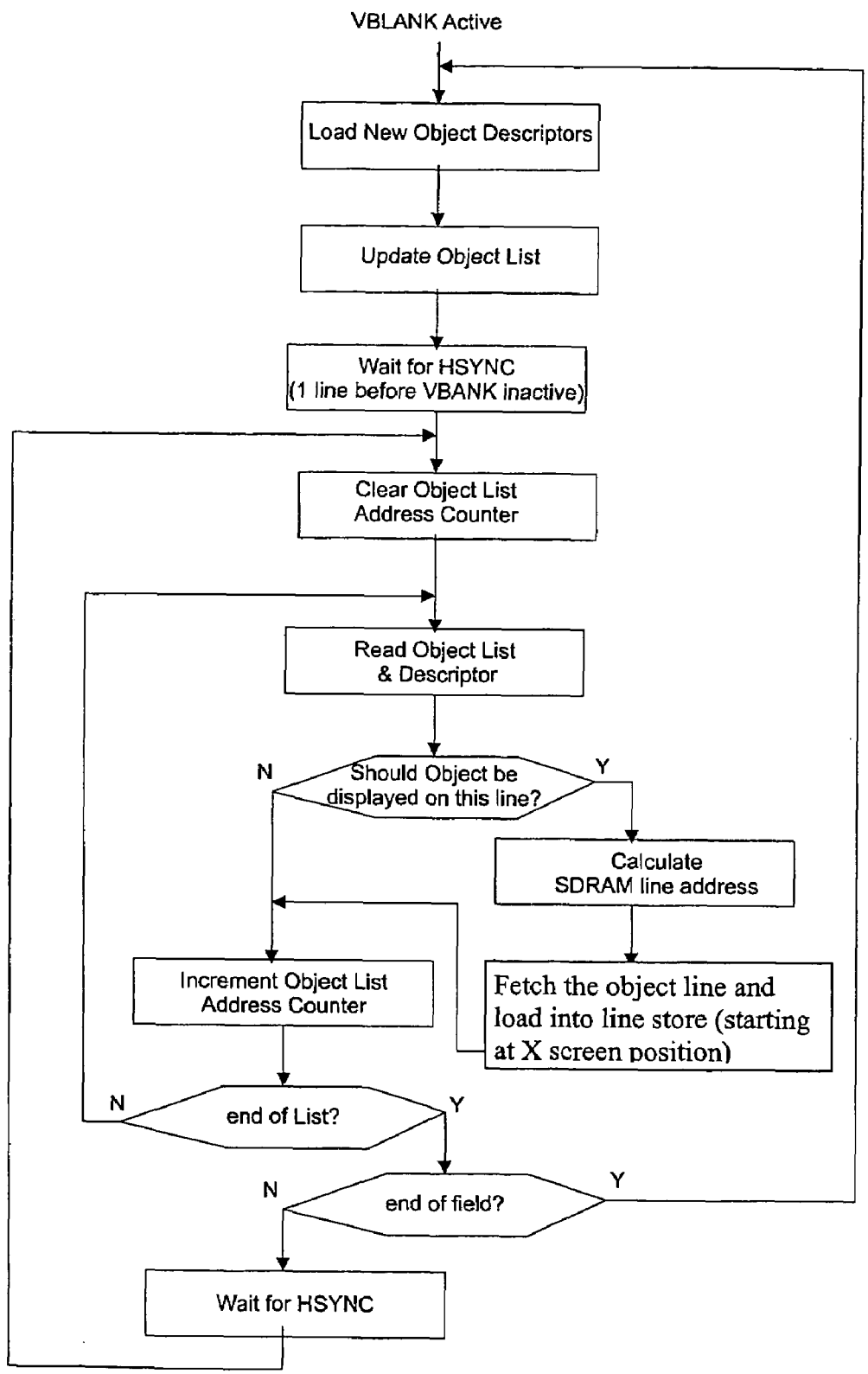
FIG. 2 is a flow diagram illustrating a method of operation of the set-top box of FIG. 1.

Once the object list and object descriptor RAMs 6,7 have been loaded, control of the process is taken over by the hardware controller 9. Amalgamated bitmaps are composed one line at a time using one of the line stores, whilst the previously composed line buffered in the other line store is being read. This process is illustrated in the flow diagram of FIG. 2. After loading of the object list and object descriptor RAMs 6,7, for each line, the hardware controller 9 cycles through all of the objects contained in the list RAM 6, once per active horizontal video line. For each object, the object descriptor RAM 7 passes the corresponding line position data to the hardware controller 9. If the object does not contribute to the line under construction, the next object in the list is read. If the read object does contribute to the line under construction, the appropriate line of the corresponding bitmap is caused to be read from the SDRAM 5 and supplied to the input of the colour table block 10.

The start address of the first line of an object is contained in the object descriptor, and the address is incremented up to the width of the object. For each further line to be displayed in the current screen, the start address is always the start SDRAM address contained in the descriptor plus the object width in words contained in the descriptor multiplied by the difference between the current line count and the start line.

Each SDRAM memory read operation returns a 32 bit word from the SDRAM 5. This is parsed into individual pixels, depending upon the pixel resolution. Writing to the line buffer 13a,13b is inhibited should the X address be greater than 720, although this would only happen in the event of a software error. Bitmap data is written in the correct X position in the line buffer 13*a*,13*b* (relative to the screen), and can either replace data previously written in the corresponding locations, or can be alpha blended with previous object data.

The construction process could be based on the use of a 10 bit line counter and a 10 bit pixel counter, which between them define the XY position on the screen. The pixel counter is used to address the line buffer and defines 720 pixel locations per line. The line counter defines an active line in a complete video frame, i.e. 1-576 in PAL and 1-480 in NTSC.

The line counter is initialised to the value 001 hex at the start of the last blanked line before the top field is displayed. It then increments by two at some time during each horizontal flyback. At the start of the last blanked line before the bottom field is displayed, the line counter is initialised to the value 002 hex, and it then increments by two during each horizontal flyback. With this arrangement odd values of the line counter always indicate positions above even values, and the line count value is one field line ahead of when an objects loaded into the line buffer will be displayed.

The display of an object can start in any field, but these objects are actually stored as consecutive lines within the SDRAM (i.e. not as two separate fields). The top left hand pixel is stored in the first SDRAM word assigned for that object. The pixels produced from lesser significant bits will be displayed to the left of those from higher significant bits.

An automatic background fill facility is provided, and this is enabled with a control bit which is detected by the hardware controller 9. This loads the complete line buffer with a background fill colour which has been previously defined by software. This is done during the horizontal flyback after the previous contents of the line buffer have been displayed, and results in the background fill requiring no external memory bandwidth or processing power. This background colour has the lowest display priority, and when applicable will be replaced by a DVB region fill or an object.

When alpha blending between OSD objects is not supported, the latest pixel from an overlapping object replaces the current line buffer contents. However, if the new pixel value is all zeros, a write to the line buffer at that pixel location is inhibited. Such an all zero value defines a hole in the object through which a previous object should still be visible. Since objects are rarely rectangular in shape, then 'holes' will be necessary to fill in a complete rectangle.

In the system presented here, the DVB concept of regions is needed only to identify objects using the same colour lookup table. Thus software must use the DVB object_id, which identifies the objects within a particular region, to define a fixed CLUT address for all objects within the region. If the DVB region_fill_flag is set however, a special region object must be defined in the list of objects to be displayed. A region object indicator flag is provided for this purpose, and, when set, a single colour rectangular object will be loaded into the line buffer by the control block. No SDRAM fetches are required for this object and the resulting spare address bits can alternatively be used to define the pixel value, be it 4/8 bits per pixel or true colour. The remaining descriptor bits are used for their usual purpose, and define the CLUT and screen position of the DVB region. Several region objects can be defined, but they will not occupy the same lines if they are DVB compliant (although overlaps would not actually cause a problem). These region objects must have the lowest object display priority.

Bitmap objects can now be created anywhere in system memory (SDRAM), without any relationship to their physical position on the screen. There is no need to move them to a separate bitmap area defining a region or frame. By allowing random writes to the line buffer, but which correspond to the horizontal position on the screen, a line representing the amalgamation of all objects on that line can be composed just before display time. Only the lines of bitmap objects which are to be displayed on a particular line have to be fetched from the storage area. A complete OSD line only has to be fetched only if an OSD occupies the complete line.

Objects which overlap simply cause overwriting to occur at a line buffer addresses, and the order of writing the objects corresponds to the display priority. The amount of object overlapping in any one line is only limited by the increase in memory bandwidth required to fetch pixels from SDRAM which are never actually seen on the screen. Object overlapping does, however, require that one of the pixel values is actually transparent and inhibits a write to the line buffer at that location. In other words, when an object is written on top of another object, the new object may have holes in it which allow the original object still to be visible. One of the pixel values thus has to mean a 'hole' rather than a colour. When this pixel value is detected, the write to the line buffer is inhibited at that pixel position.

Alternatively, alpha blending is possible between overlapping objects, rather than simply overwriting an object with a new object. A read modify write operation is then needed every time a pixel is written to the line buffer. Alpha blending is of course only possible if the pixel colour format represents a true colour, rather than an index to a lookup table. The colour format must also contain bits which represent an alpha value for that pixel, or alternatively a common alpha value can be defined for the whole object.

The proposed system avoids the need for frame stores, planes and OSD regions. The line buffer can be loaded with a background colour during the horizontal flyback period such that this operation does not require any bandwidth from the storage area, and thus background filling between objects is obtained for 'free'. Only pixels for the actual objects need be fetched from the SDRAM.

It will be appreciated by the person of skill in the art that various modifications may be made to the above described embodiment without departing from the scope of the present invention.

The invention claimed is:

1. Apparatus for controlling a digital television display, the apparatus comprising:

a main processor;

a main memory coupled to said main processor via address and data busses, the main memory being arranged to store at least temporarily video data for display, and on-screen display graphics for overlaying on video data;

mixing means for mixing video data read from the main memory under the control of the main processor, with on-screen display graphic data;

at least one line buffer for storing a line of on-screen display graphic data;

hardware processing means for composing a line of on-screen display graphic data in the line buffer by reading appropriate on-screen display graphic data from said main memory and writing it to the line buffer, and for providing the composed line of data to said mixing means;

a first memory for storing a list of on-screen display objects; and a second memory for storing object descriptors, each entry in said list pointing to an object descriptor, and each descriptor specifying a bitmap stored in said main memory.

2. Apparatus according to claim 1, the apparatus comprising at least two line buffers, one of the buffers being written to by said hardware processing means whilst the other is being read from.

3. Apparatus according to claim 1, the main processor being arranged to load into the first and second memories, for each frame to be displayed, object and descriptor data for that frame, and, based upon the contents of the first and second memories, said hardware processing means is arranged to read appropriate on-screen display graphic data from said main memory and writes it to the line buffer.

4. Apparatus according to claim 3, said hardware processing means being arranged to load background fill colour data into locations of the line buffer in dependence upon descriptor data contained in said second memory.

5. Apparatus according to claim 1, wherein said main processor, said line buffer(s), and said hardware processing means are integrated onto a single chip, with the main memory being provided on a separate device.

6. A method of controlling a digital television display, the method comprising:
in a main memory controlled by a main processor, storing at least temporarily video data for display, and on-screen display graphics for overlaying on video data;
composing a line of on-screen display graphic data in a line buffer by reading appropriate on-screen display graphic data from said main memory and writing it to the line buffer;
reading data from the line buffer and mixing the read data with video data read from the main memory
storing a list of on-screen display objects in a first memory; and
storing object descriptors in a second memory, each entry in said list pointing to an object descriptor, and each descriptor specifying a bitmap stored in said main memory.

7. A method according to claim 6, wherein said on-screen display graphics comprise one or more objects, each represented by a corresponding bitmap.

8. A method according to claim 6, wherein, for a given frame, the contents of the first and second memories are inspected to determine which on-screen display graphics data should be loaded into the line buffer, on a line-by-line basis.

9. A method according to claim 8, comprising comparing the vertical extent of each graphic or object with the vertical location of the line currently under construction in the line buffer, and, if the graphic contributes to the current line, the corresponding line data for the graphic is read from the main memory to the line buffer.

10. A method according to claim 6, where graphic data is stored in the main memory in RGB colour space, the data being converted to YcrCb colour space prior to writing it to the line buffer.

11. A method according to claim 6, where graphic data is stored in the main memory in 4:4:4 colour resolution, and data read from the line buffer is convened into 4:2:2 colour resolution prior to mixing with video data.

* * * * *